US009566743B2

(12) United States Patent
Kozlak et al.

(10) Patent No.: US 9,566,743 B2
(45) Date of Patent: *Feb. 14, 2017

(54) METHOD FOR BUILDING AND USING THREE-DIMENSIONAL OBJECTS CONTAINING EMBEDDED IDENTIFICATION-TAG INSERTS

(71) Applicant: Stratasys, Inc., Eden Prairie, MN (US)

(72) Inventors: David M. Kozlak, Medina, MN (US); Steven A. Chillscyzn, Victoria, MN (US); J. Samuel Batchelder, Somers, NY (US)

(73) Assignee: Stratasys, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/484,982

(22) Filed: Sep. 12, 2014

(65) Prior Publication Data

US 2015/0001750 A1 Jan. 1, 2015

Related U.S. Application Data

(63) Continuation of application No. 12/006,956, filed on Jan. 8, 2008, now Pat. No. 8,858,856.

(51) Int. Cl.
| | |
|---|---|
| *B29C 41/20* | (2006.01) |
| *B29C 70/70* | (2006.01) |
| *B29C 67/00* | (2006.01) |
| *B29C 33/44* | (2006.01) |
| *G06K 19/07* | (2006.01) |
| *G06K 17/00* | (2006.01) |
| *B29C 70/68* | (2006.01) |

(52) U.S. Cl.
CPC ......... *B29C 67/0088* (2013.01); *B29C 33/448* (2013.01); *B29C 67/0055* (2013.01); *B29C 67/0062* (2013.01); *B29C 67/0092* (2013.01); *G06K 17/00* (2013.01); *G06K 19/0723* (2013.01); *B29C 70/68* (2013.01); *G06K 2017/0083* (2013.01); *G06K 2017/0087* (2013.01)

(58) Field of Classification Search
CPC .. B29C 41/20; B29C 67/0062; B29C 67/0088; B29C 70/68; B29C 70/70; B29C 67/0055; G06K 19/0723
USPC ........... 264/259, 279, 279.1, 308; 340/572.1, 340/572.8, 572.9
See application file for complete search history.

(56) References Cited

U.S. PATENT DOCUMENTS

| | | |
|---|---|---|
| 4,665,492 A | 5/1987 | Masters |
| 5,059,266 A | 10/1991 | Yamane et al. |

(Continued)

OTHER PUBLICATIONS

International Search Report and Written Opinion dated Jan. 30, 2009 for International Patent Application No. PCT/US2008/013668, filed Dec. 12, 2008.

(Continued)

*Primary Examiner* — Leo B Tentoni
(74) *Attorney, Agent, or Firm* — Westman, Champlin & Koehler, P.A.

(57) ABSTRACT

A method for building a three-dimensional object containing an identification-tag insert, the method comprising performing a build operation to form layers of the three-dimensional object using a layer-based additive technique, placing the identification-tag insert on at least a portion of the layers during the build operation, and reading information from the identification-tag insert.

18 Claims, 6 Drawing Sheets

(56) References Cited

U.S. PATENT DOCUMENTS

| | | |
|---|---|---|
| 5,121,329 A | 6/1992 | Crump |
| 5,131,706 A | 7/1992 | Appleberry |
| 5,169,081 A | 12/1992 | Goedderz |
| 5,173,220 A | 12/1992 | Reiff et al. |
| 5,340,433 A | 8/1994 | Crump |
| 5,426,722 A | 6/1995 | Batchelder |
| 5,430,951 A | 7/1995 | Jacky |
| 5,695,707 A | 12/1997 | Almquist et al. |
| 5,705,117 A | 1/1998 | O'Connor et al. |
| 5,807,437 A | 9/1998 | Sachs et al. |
| 5,866,058 A | 2/1999 | Batchelder et al. |
| 5,939,008 A | 8/1999 | Comb et al. |
| 5,965,079 A | 10/1999 | Manners |
| 6,028,410 A | 2/2000 | Leavitt et al. |
| 6,054,077 A | 4/2000 | Comb et al. |
| 6,129,872 A | 10/2000 | Jang |
| 6,175,422 B1 | 1/2001 | Penn et al. |
| 6,193,923 B1 | 2/2001 | Leyden et al. |
| 6,228,923 B1 | 5/2001 | Lombardi et al. |
| 6,275,157 B1 | 8/2001 | Mays et al. |
| 6,471,800 B2 | 10/2002 | Jang et al. |
| 6,562,278 B1 | 5/2003 | Farnworth et al. |
| 6,574,523 B1 | 6/2003 | Hanna et al. |
| 6,600,965 B1 | 7/2003 | Hull et al. |
| 6,629,011 B1 | 9/2003 | Calderon et al. |
| 6,685,866 B2 | 2/2004 | Swanson et al. |
| 6,722,872 B1 | 4/2004 | Swanson et al. |
| 6,730,252 B1 | 5/2004 | Teoh et al. |
| 6,813,594 B2 | 11/2004 | Guertin et al. |
| 6,814,907 B1 | 11/2004 | Comb |
| 6,822,609 B2 | 11/2004 | Mendolia et al. |
| 6,893,590 B1 | 5/2005 | Rigosi et al. |
| 6,976,627 B1 | 12/2005 | Culp et al. |
| 7,185,734 B2 | 3/2007 | Widmer et al. |
| 7,419,630 B2 | 9/2008 | Palmer et al. |
| 7,685,694 B2 | 3/2010 | Zagagi et al. |
| 2003/0004600 A1 | 1/2003 | Priedeman, Jr. |
| 2003/0209837 A1 | 11/2003 | Farnworth |
| 2004/0012923 A1 | 1/2004 | Chen |
| 2004/0159978 A1 | 8/2004 | Nielsen et al. |
| 2004/0175450 A1 | 9/2004 | Yanagisawa et al. |
| 2005/0023145 A1 | 2/2005 | Cohen et al. |
| 2005/0147781 A1 | 7/2005 | Dronzek, Jr. et al. |
| 2005/0173838 A1 | 8/2005 | Priedeman, Jr. et al. |
| 2005/0194401 A1 | 9/2005 | Khoshnevis |
| 2005/0206500 A1* | 9/2005 | Ferren et al. .............. 340/572.8 |
| 2006/0158456 A1 | 7/2006 | Zinniel et al. |
| 2007/0071902 A1 | 3/2007 | Dietrich et al. |
| 2007/0233298 A1 | 10/2007 | Heide et al. |
| 2008/0006966 A1 | 1/2008 | Mannella |
| 2008/0015727 A1 | 1/2008 | Dunne et al. |
| 2008/0094224 A1 | 4/2008 | Parker et al. |
| 2009/0072436 A1 | 3/2009 | Dean |

OTHER PUBLICATIONS

Wohler's Report 2007, "Part 6: Rapid Manufacturing", Wohler's Associates Inc., Copyright 2007, pp. 126-127 and 136-137.
Product Description, RepRap Pick and Place Tool, taken from www.reprap.org, published Feb. 11, 2007.

* cited by examiner

METHOD FOR BUILDING AND USING THREE-DIMENSIONAL OBJECTS CONTAINING EMBEDDED IDENTIFICATION-TAG INSERTS

CROSS-REFERENCE TO RELATED APPLICATION(S)

This application is a continuation of U.S. patent application Ser. No. 12/006,956, filed 1 Jan. 8, 2008, and published as U.S. Pat. No. 8,858,856; the contents of which are incorporated by reference in its entirety.

BACKGROUND

The present invention relates to methods for building three-dimensional (3D) objects. In particular, the present invention relates to methods for building 3D objects with layer-based additive techniques.

Rapid prototyping/rapid manufacturing (RP/RM) systems are used to build 3D objects from computer-aided design (CAD) models using one or more layer-based additive techniques. Examples of commercially available layer-based additive techniques include fused deposition modeling, ink jetting, selective laser sintering, electron-beam melting, and stereolithographic processes. For each of these techniques, the CAD model of the 3D object is initially sliced into multiple horizontal layers. For each sliced layer, a build path is then generated, which provides instructions for the particular RP/RM system to form the given layer. For deposition-based systems (e.g., fused deposition modeling and ink jetting), the build path defines the pattern for depositing roads of build material from a moveable deposition head to form the given layer. Alternatively, for energy-application systems (e.g., selective laser sintering, electron-beam melting, and stereolithographic processes), the build path defines the pattern for emitting energy from a moveable energy source (e.g., a laser) to form the given layer.

In fabricating 3D objects by depositing layers of build materials, supporting layers or structures are typically built underneath overhanging portions or in cavities of objects under construction, which are not supported by the build material itself. A support structure may be built utilizing the same deposition techniques by which the build material is deposited. The host computer generates additional geometry acting as a support structure for the overhanging or free-space segments of the 3D object being formed. The support material adheres to the build material during fabrication, and is removable from the completed 3D object when the build process is complete.

While fabricating 3D objects with layer-based additive techniques, a common issue for manufacturers is the identification and tracking of the 3D objects during post-build operations. This is particularly true for rapid manufacturing applications, where multiple RP/RM systems continuously build 3D objects based on large-volume job queues. In these cases, it may be difficult to identify and track the large quantities of 3D object built, particularly when such 3D objects typically require post-build operations before completion. Thus, there is an ongoing need for methods for identifying and tracking 3D objects during fabrication processes with layer-based additive techniques.

SUMMARY

The present invention relates to a method for building a 3D object containing an identification-tag (ID-tag) insert. The method includes performing a build operation to form layers of the 3D object using a layer-based additive technique, and placing the ID-tag insert on at least a portion of the layers during the build operation, thereby at least partially embedding the ID-tag insert in the 3D object. The method further includes reading information from the ID-tag insert.

DETAILED DESCRIPTION

Figure 1:
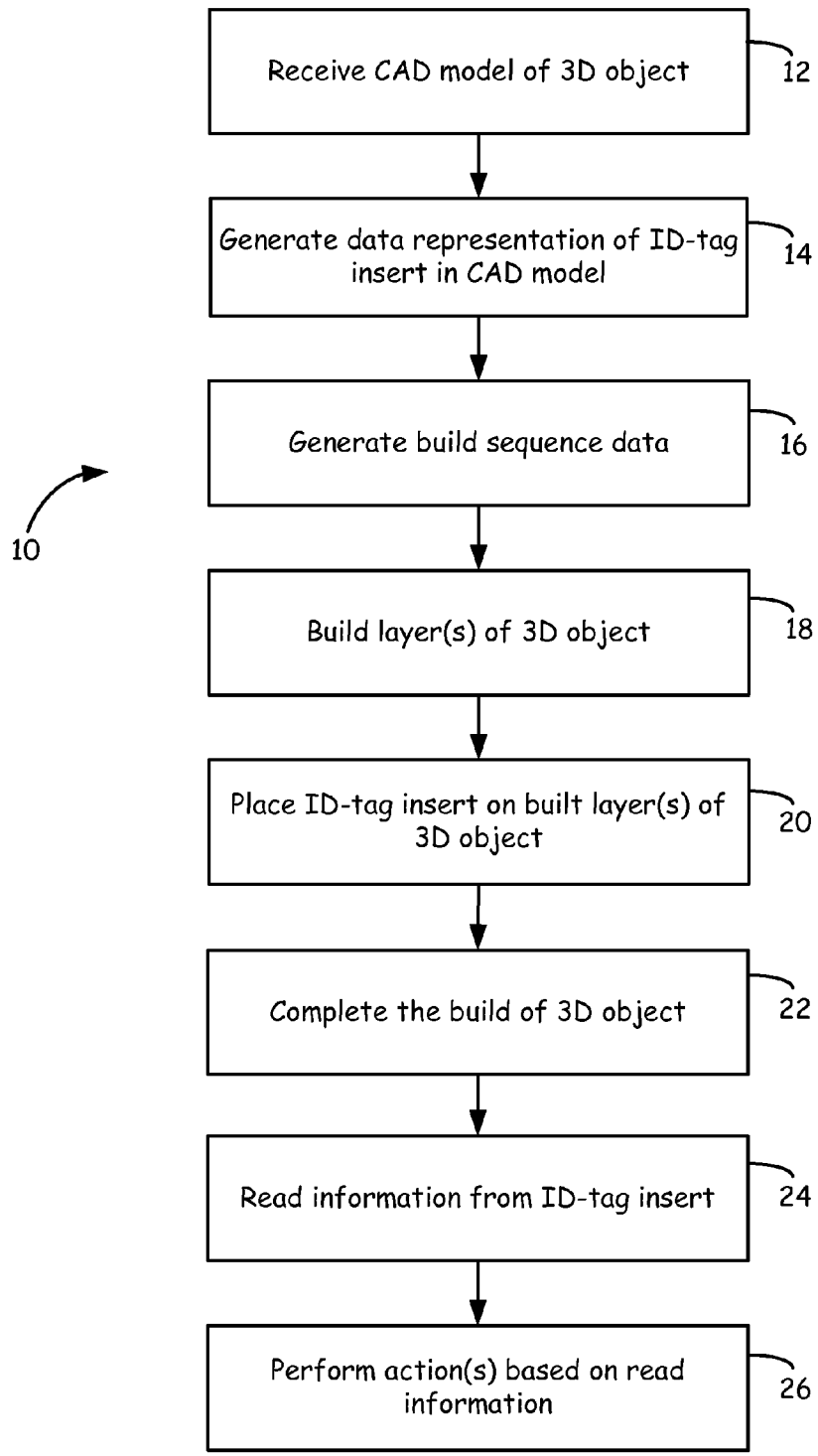
FIG. 1 is a flow diagram of a method for building a 3D object containing an ID-tag insert.

FIG. 1 is a flow diagram of method 10 for building a 3D object with an RP/RM system using a layer-based additive technique, where the 3D object contains an ID-tag insert that provides information relating to the 3D object and/or relating to one or more actions to perform on the 3D object. Method 10 includes steps 12-26, and initially involves receiving a CAD model of the 3D object to be built (step 12). The CAD model is desirably received by a host computer of the RP/RM system, and includes a data representation of the 3D object in a data format compatible with the RP/RM system (e.g., STL-format data files).

The host computer then generates a data representation of the ID-tag insert in the received CAD model (step 14), where the data representation of the ID-tag insert dimensionally corresponds to a physical ID-tag insert that will be placed in the 3D object during a build operation with the RP/RM system. The ID-tag insert may be any type of receiver-transmitter component that is compatible with the layer-based additive technique used, and that is capable of transmitting a reply signal when electronically interrogated. Examples of suitable ID-tag inserts for use with method 10 include active and passive radio-frequency identification (RFID) tags, such as high-frequency RFID tags and ultra high-frequency RFID tags. Examples of particularly suitable ID-tag inserts for use with method 10 include passive RFID tags, which may be provided as pill-form ID tags (e.g., glass-pill tags) and thin-film ID tags. In one embodiment, the layers of the 3D object functions as the substrate for the ID-tag insert. In this embodiment, the ID-tag insert may merely include the electronic components (e.g., the integrated circuit and antenna), which are placed on the layers of the 3D object during the build operation.

Suitable thin-film ID-tag inserts desirably have average film thicknesses that are about equal to the thickness of a single layer of the 3D object, or that are about equal to the combined thicknesses of multiple layers of the 3D object (e.g., less than about 500 micrometers). This allows the ID-tag insert to be substantially flush with the layers of the 3D object, thereby providing a substantially planar working surface for building subsequent layers of the 3D object. Examples of suitable average film thicknesses for the thin-film ID-tag inserts range from about the thickness of a single layer to about the combined thickness of 20 layers, with particularly suitable thicknesses for the thin-film ID-tag inserts ranging from about the thickness of a single layer to about the combined thickness of 10 layers, and with even more particularly suitable thicknesses for the thin-film ID-tag inserts ranging from about the thickness of a single layer to about the combined thickness of 5 layers.

As used herein, the term "substantially flush" refers to arrangements where the surfaces are flush (i.e., coplanar) or where the top surface of the ID-tag insert is slightly below the top layer of the build layers along a vertical z-axis. Layer-based additive processes of RP/RM systems are capable of making up the differences for vertical offsets that are within a few layers below the top layer of the build layers. Accordingly, suitable vertical offsets between the top surfaces of the inserts and the top layers of the build layers include thicknesses ranging from coplanar surfaces to distances of about three layers, with particularly suitable vertical offsets ranging from coplanar surfaces to distances of about one layer, where the non-coplanar distances of the top surfaces of the inserts extend below the top layers of the build layers along the vertical z-axis.

As discussed below, the ID-tag insert may include a variety of information, such as instructions for handling the 3D object after the build operation with the RP/RM system is complete (e.g., identification information, routing information, safety information, and information relating to post-build operations), information for customer use, information for commercial functions, information for consumer safety, information for security functions, and combinations thereof. The information may be included in the ID-tag insert prior to being placed in the 3D object, or may be written to the ID-tag insert after the ID-tag insert is placed in the 3D object. The format of the information included in the ID-tag insert may vary depending on the type of ID-tag insert used, the scanning system used to read the information from the ID-tag insert, and the purpose of the information. In one embodiment, the information included in the ID-tag insert is an alphanumeric code that corresponds to one or more defined actions that will be performed on the 3D object after the build operation is complete. For example, the alphanumeric code may correspond to a set of defined instructions that designate the post-build operations that will be performed on the 3D object (e.g., support structure removal and surface smoothing processes). In alternative embodiments, the ID-tag insert may include textual information and/or computer instructions dictating how the 3D object will be handled after the build operation is complete, thereby allowing the ID-tag insert to be used with a variety of scanning systems without requiring defined alphanumeric codes.

Pursuant to step 14 of method 10, the data representation of the ID-tag insert is desirably generated at a location in the CAD model that substantially preserves the structural integrity of the 3D object (e.g., a central location within the CAD model), and that allows the ID-tag insert to communicate with one or more scanning systems. The data representation of the ID-tag insert may also be generated at locations in the CAD model that preserve or enhance other qualities of the 3D object (e.g., aesthetic and functional qualities). For thin-film, ID-tag inserts, the data representations of the ID-tag inserts are also desirably oriented in a horizontal manner, thereby allowing the thin-film, ID-tag inserts to align with the layers of the 3D objects to form substantially flush working surfaces. As discussed below, this allows the thin-film, ID-tag inserts to function as layers of the 3D objects, which increases the efficiencies of build operations with RP/RM systems. Alternatively, crown inserts may be placed over the ID-tag inserts to provide substantially planar top surfaces, as disclosed in U.S. patent application Ser. No. 12/006,955, entitled "Method for Building Three-Dimensional Objects Containing Embedded Inserts".

After the data representation of the ID-tag insert is generated, the host computer generates build sequence data for building the 3D object from the CAD model (step 16). The build sequence data is a set of instructions that direct the RP/RM system to build the 3D object using the layer-based additive technique. The build sequence data also directs when and how the ID-tag insert is placed in the 3D object during the build operation. In one embodiment, the host computer analyzes the CAD model and generates the build sequence data using the techniques disclosed in U.S. patent application Ser. No. 12/006,955, entitled "Method for Building Three-Dimensional Objects Containing Embedded Inserts". The resulting build sequence data is then relayed to the RP/RM system for performing the build operation to fabricate the 3D object and any corresponding support structure.

During the build operation, the RP/RM system initially builds one or more layers of the 3D object from a build material (step 18), and may also build one or more layers of a corresponding support structure. The 3D object may be built with any suitable RP/RM system that fabricates 3D objects using a layer-based additive technique. Examples of suitable RP/RM systems include deposition-based systems (e.g., fused deposition modeling and ink jetting systems), which deposit roads of build material from a moveable deposition head to form the layer(s) of the 3D object, and energy-application systems (e.g., selective laser sintering, electron-beam melting, and stereolithographic systems), which emit energy from a moveable energy source (e.g., a laser) to form the layer(s) of the 3D object. In one embodiment, the RP/RM system is a system that includes an automated insert-placement apparatus as disclosed in U.S. patent application Ser. No. 12/006,947 entitled "System for Building Three-Dimensional Objects Containing Embedded Inserts, and Methods of Use Thereof".

After the initial layer(s) of the 3D object are built, the ID-tag insert is then placed on at least a portion of the built layer(s) of the 3D object (step 20). The ID-tag insert may be placed on the built layer(s) manually or in an automated manner. The RP/RM system then builds one or more additional layers of the 3D object on top of the previously built layer(s) of the 3D object and on top of the ID-tag insert (step 22) to complete the build operation. The RP/RM system may also build one or more layers of the corresponding support structure. When the build operation is complete, the 3D object dimensionally corresponds to the received CAD model, and includes the ID-tag insert at least partially embedded within the 3D object.

In one embodiment, the ID-tag insert is fully embedded within the 3D object. This embodiment is beneficial because a fully embedded ID-tag insert is not visible outside of the 3D object, thereby preserving the aesthetic qualities of the 3D object. Additionally, a fully embedded ID-tag insert is not affected by post-build operations that modify the exterior surface of the 3D object, such as support structure removal and surface smoothing processes. As a result, the ID-tag insert may be used while the 3D object undergoes a variety of different surface-modifying operations.

After the build operation is complete, the 3D object is removed from the RP/RM system and may undergo one or more post-build operations, packaging, and shipping. Additionally, as discussed above, in one embodiment, information may be written to the ID-tag insert after the ID-tag insert is placed in the 3D object. In this embodiment, the information may be written to the ID-tag at one or more points in time after the build operation is complete, where the ID-tag insert is at least partially embedded within the 3D object. For example, information may be written to the ID-tag after the build operation is complete and prior to shipment to the customer. Alternatively, the ID-tag may remain unwritten until received by a customer, thereby allowing the customer to control the information that is written to and read from the ID-tag insert. Furthermore, the ID-tag insert may rewritable to allow the information relating to the 3D object be updated and/or replaced.

At one or more points in time after the build operation is complete and the ID-tag insert includes information relating to the 3D object, the information in the ID-tag insert is read by passing the 3D object by one or more scanning systems (step 24). The type of scanning system(s) used may vary depending on the type of ID-tag insert used, and are desirably capable of reading information from the ID-tag insert while the ID-tag insert is embedded within the 3D object. For example, for a passive RFID tag insert fully embedded within a 3D object, the information may be read from the passive RFID tag insert with a radio-frequency (RF) transmitter/receiver that transmits an RF signal through the 3D object, to the passive RFID tag insert embedded within the 3D object. The RF signal induces a small electrical current in an antenna of the passive RFID tag insert, thereby providing power for an integrated circuit of the RFID tag insert to transmit the information back to the RF transmitter/receiver. In alternative embodiments, one or more scanning systems may be retained within the RP/RM system, thereby allowing the scanning system(s) to readily read the information from the ID-tag insert after the build operation is complete.

The information read from the ID-tag insert may provide instructions and details relating to the 3D object and/or relating to one or more actions to perform on the 3D object (e.g., by the manufacturer and/or by the customer). In one embodiment, the information read from the ID-tag insert provides instructions for handling the 3D object after the build operation is complete. For example, the ID-tag insert may include routing information for directing where the 3D object is to be transported after the build operation is complete, and for tracking the 3D object during transit. This information is particularly suitable for rapid manufacturing applications, where large numbers of build operations are being performed. The ID-tag inserts accordingly allow each 3D object to be accurately routed and tracked to the appropriate location, thereby reducing the risk of misdirecting one or more of the built 3D objects.

The ID-tag insert may also include identification information for the 3D object, which allows the manufacturer to readily identify the customer, batch and lot numbers, purchase information, job queue orders, and other similar types of identification details. Such information further assists the manufacturer in routing and tracking the 3D object after the build operation is complete.

In addition to routing and identification information, the ID-tag insert may also include information relating to physical handling requirements for the 3D object. For example, if the 3D object contains fragile portions that could be damaged during transit, the ID-tag insert may provide special handling requirements to ensure that the fragile portions remain intact. This is particularly beneficial for 3D objects having fragile portions that are difficult to visually recognize (e.g., hollow interior cavities).

The ID-tag insert may also include information relating to safety requirements for handling the 3D object. This is beneficial for 3D objects built with materials that may be skin irritants, or that may be otherwise hazardous to handle. In one embodiment, the read information provides a material data safety sheet (MSDS), or similar information (e.g., lot, batch, and container information), for the build materials used to form the 3D object and corresponding support structure. This allows the manufacturer to readily identify whether safety precautions are required before handling the 3D object.

Furthermore, the ID-tag insert may include information relating to one or more post-build operations to be performed on the 3D object, such as support structure removal, surface smoothing processes, cooling operations, cleaning operations, machining, benching, painting, packaging, and combinations thereof. This allows the manufacturer to readily identify which post-build operations are required before the 3D object may be shipped to the customer. Such information may also include routing information that identifies which post-build operation station the 3D object will be transported to, and information relating to processing parameters for the given post-build operation.

Examples of particularly suitable post-build operation information includes information relating to support structure removal, surface smoothing processes, and combinations thereof. For example, the read information may identify that the 3D object has a water-soluble support structure that needs removed, and may provide the location and job queue of an appropriate support removal station. This embodiment is beneficial because it may be difficult for the manufacturer to visually identify a given 3D object prior to the removal of the support structure. Moreover, the information read from the ID-tag insert may also identify the processing parameters for the support structure removal, such as temperature requirements, circulation routines, handling limitations, and pH levels.

With respect to surface smoothing processes, the read information may identify that the 3D object requires a surface smoothing process, and may provide the location and job queue of an appropriate surface smoothing station. Examples of suitable surface smoothing processes that may be identified with the information from the ID-tag insert include vapor smoothing processes as disclosed in Priedeman Jr., et al., U.S. Patent Application Publication No. 2005/0173838, entitled "Smoothing Method for Layered Deposition Modeling", and surface-treatment processes as disclosed in Zinniel, U.S. patent application Ser. No. 11/652,876, entitled "Surface-Treatment Method for Rapid-Manufactured Three-Dimensional Objects". The read information may also identify the processing parameters for the surface smoothing process, such as smoothing solvents, smoothing temperatures and durations, and safety requirements.

The ID-tag insert may also include information relating to a variety of additional manufacturing steps in an overall manufacturing process. In one embodiment, method 10 may be a single step of multiple steps in a manufacturing process (e.g., a digital manufacturing process). As such, the information retained by the ID-tag insert may be used to assist in performing the subsequent steps in the manufacturing process. For example, the ID-tag insert may provide tracking and processing instructions for a variety of subsequent manufacturing steps, such as painting, machining, gluing, annealing, metrology, stressing, plating, and combinations thereof.

The ID-tag insert may also include information that allows the customer to identify the 3D object. A common practice in product development is to build multiple 3D objects with RP/RM systems, where each of the 3D objects has a different design and/or physical property. This allows the developer to test each of the 3D objects to identify the optimal designs and physical properties. However, it may be difficult to visually distinguish the differences in the designs and physical properties among the built 3D objects. Thus, the developer may use a scanning system to read the information contained in the ID-tag inserts, thereby allowing the developer to identify the particular designs and physical properties for each of the 3D objects.

The ID-tag may also include information relating to a variety of commercial, safety, and/or security functions, such as product tracking, transportation tracking, aviation security, inventory tracking, theft detection, and the like. For example, the ID-tag may be used for shoplifting prevention in a store by setting off an alarm if a scanner located at an entrance of the store reads information from the ID-tag insert embedded in the 3D object. Accordingly, the ID-tag inserts embedded in the 3D objects may be used with many different information-reading systems.

After the information is read from the ID-tag insert, one or more actions may be performed based at least in part on the read information (step 26). For example, the manufacturer may read the information from the ID-tag insert, and then perform one or more actions on the 3D object based at least in part on the read information to fulfill customer orders. As discussed above, the action(s) may include identifying the 3D object (e.g., identifying the customer and batch/lot numbers), routing and tracking the 3D object after the build operation is complete, performing special handling actions to reduce the risk of damaging the 3D object, taking safety measures to reduce the risk of injury while handling the 3D object, performing post-build operations (e.g., support structure removal and surface smoothing processes), and combinations thereof. Accordingly, embedding the ID-tag insert in the 3D object during the build operation allows the required action(s) to be taken after the build operation is complete. As discussed above, this is particularly suitable for rapid manufacturing applications, and allows the manufacturer to readily track each of the numerous 3D objects, and to obtain required information for performing post-build operations.

An additional benefit of the above-discussed method 10 is that fully embedded ID-tag inserts, which are not visually observable to a customer, are not required to be removed after the action(s) are complete. Thus, in contrast to identification markings located externally to the 3D object (e.g., on the support structures), the ID-tag inserts may remain fully embedded within the 3D objects, and may continue to provide information even after the post-build operations are complete and the 3D object is packaged for shipping.

While the above discussion of method 10 refers to the use of a single ID-tag insert embedded within a 3D object, method 10 is also suitable for building a 3D object containing multiple ID-tag inserts, where the multiple ID-tag inserts provide information for performing a variety of action(s). The multiple ID-tag inserts may be placed on the same or different layers of the 3D object during the build operation. This embodiment is beneficial for pre-programmed ID-tag inserts, where each ID-tag insert placed in the 3D object may be pre-programmed to provide a specific type of information. For example, a first type of ID-tag insert may provide instructions for removing a support, and second type of ID-tag insert may provide instructions for performing a surface smoothing process. The pre-programmed ID-tag inserts may then be placed within 3D objects that require those particular post-build operations, and omitted from 3D objects that do not require those particular post-build operations. The scanning system(s) may then read the information from each embedded ID-tag insert to identify which post-build operations are required for each of the 3D objects.

Figure 2A:
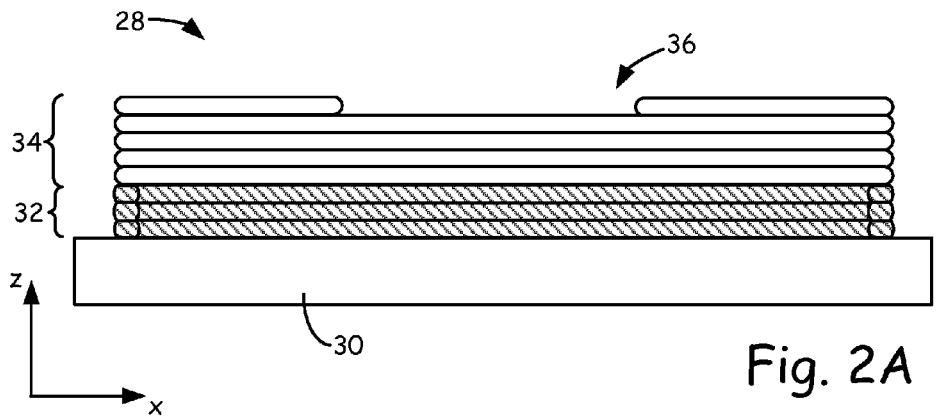
FIGS. 2A-2C are schematic views of a first 3D object being built using a horizontal placement technique for placing an ID-tag insert in the first 3D object.
Figure 2B:
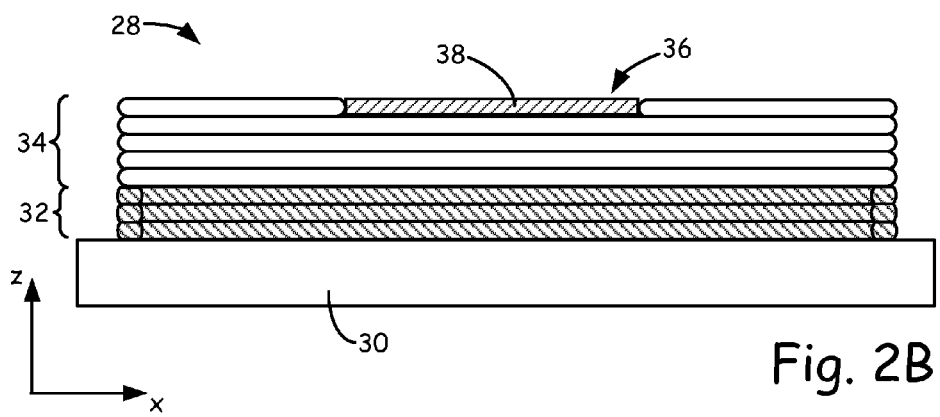
Figure 2C:
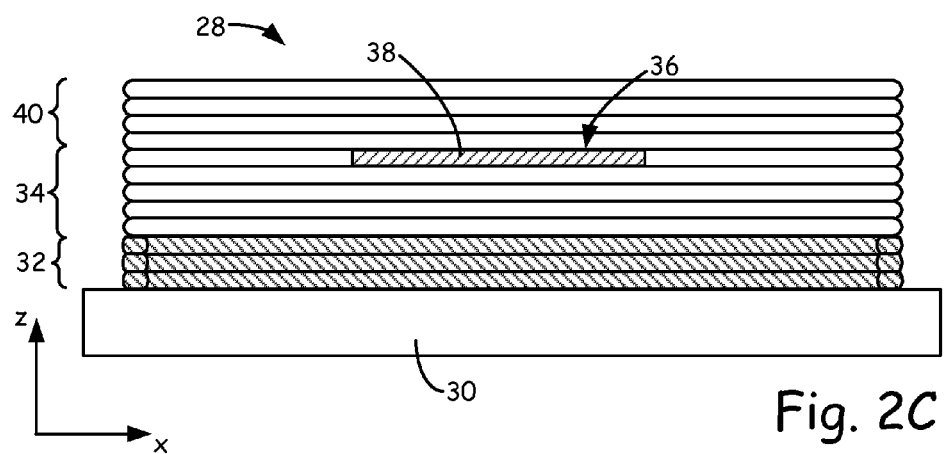

FIGS. 2A-2C, 3A-3C, 4A-4C, 5, and 6 are illustrations of suitable techniques for building 3D objects containing embedded ID-tag inserts, pursuant to steps 18-22 of method 10 (shown in FIG. 1). FIGS. 2A-2C are schematic views of 3D object 28 being built on substrate platform 30 of an RP/RM system (not shown), which illustrate a horizontal placement technique. As shown in FIG. 2A, pursuant to step 18 of method 10, the RP/RM system initially forms support layers 32 and build layers 34 in a horizontal x-y plane on substrate platform 30. The horizontal x-y plane is a plane defined by an x-axis and a y-axis (not shown in FIG. 2A), where the x-axis, the y-axis, and the z-axis are orthogonal to each other. As used herein, the term "axis" refers to a coordinate axis of a spatial coordinate system (e.g., a Cartesian coordinate system). The thicknesses of support layers 32 and build layers 34 are exaggerated for ease of discussion.

In the current example, support layers 32 are formed to assist the removal of 3D object 28 from substrate platform 30 after the build operation is complete. Build layers 34 are a first set of layers of 3D object 28, and are formed up to the point where the ID-tag insert (not shown in FIG. 2A) will be placed. This is desirable for deposition-based RP/RM systems to reduce the risk of collisions between the deposition head and the placed ID-tag insert during the build operation. Accordingly, build layers 34 define pocket 36, which is an unfilled region in build layers 34 that desirably corresponds to the dimensions of the ID-tag insert. The horizontal arrangement of pocket 36 allows the ID-tag insert to placed horizontally in pocket 36, which is beneficial for use with thin-film, ID-tag inserts, and is also suitable for use with pill-form ID-tag inserts.

As shown in FIG. 2B, after build layers 34 are formed, ID-tag insert 38 is placed in pocket 36, manually or in an automated manner, pursuant to step 20 of method 10. The arrangement of pocket 36 in the horizontal x-y plane allows ID-tag insert 38 to be horizontally oriented when placed in pocket 36. This allows ID-tag insert 38 to align with the top layer of build layers 34, thereby providing a substantially flush surface between ID-tag insert 38 and the top layer of build layers 34. The substantially flush surface correspondingly provides a substantially planar working surface for the formation of subsequent layers.

As shown in FIG. 2C, after ID-tag insert 38 is placed in pocket 36, the RP/RM system then forms build layers 40 of 3D object 28 on top of build layers 34 and on top of ID-tag insert 38. Build layers 40 are a second set of layers of 3D object 28, formed pursuant to step 22 of method 10, which complete the build operation for 3D object 28. After the build operation is complete, ID-tag insert 38 is centrally located within 3D object 28, which substantially preserves the structural integrity of 3D object 28. At this point, 3D object 28 may be removed from the RP/RM system and one or more scanning systems may read the information from ID-tag insert 38 (pursuant to step 24 of method 10). As discussed above, in one embodiment, the information may be written to ID-tag insert 38 after ID-tag insert 38 is placed in 3D object 28. In this embodiment, the information may be written to ID-tag 38 at one or more points in time after the build operation is complete, and the written information may be subsequently read, pursuant to step 24 of method 10. One or more actions may then be performed based at least in part on the read information, such as one or more post-build operations (pursuant to step 26 of method 10). As further shown in FIG. 2C, the central location of ID-tag insert 38 fully embeds ID-tag insert 38 within 3D object 28. This is beneficial for preserving the aesthetic qualities of 3D object 28, and allows 3D object 28 to undergo post-build, surface-modifying operations (e.g., support structure removal and surface smoothing processes) without adversely affecting ID-tag insert 38.

Figure 3A:
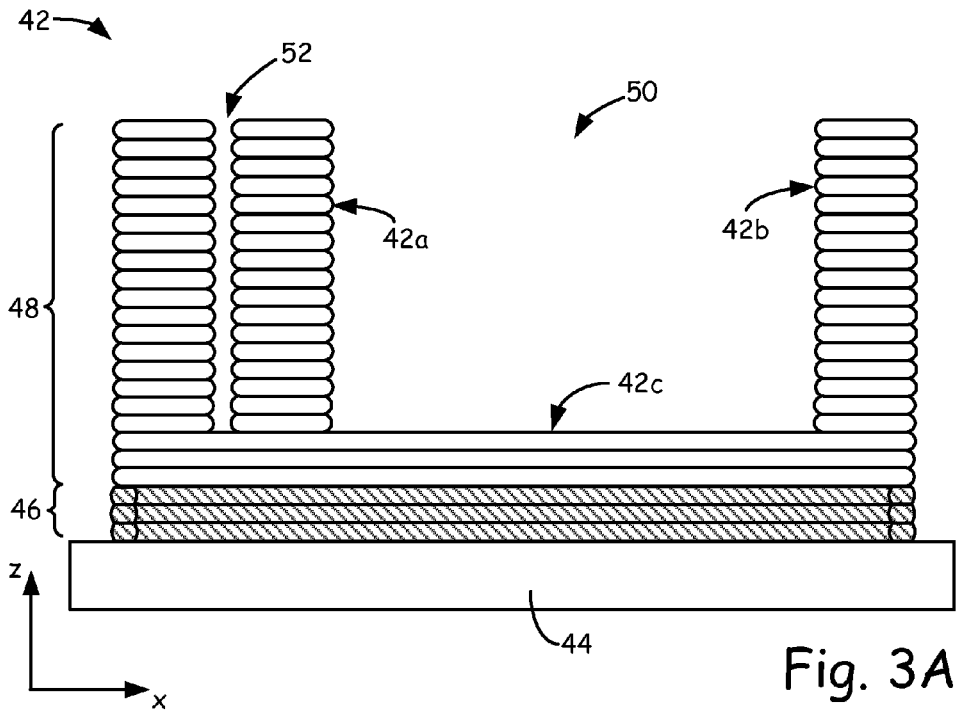
FIGS. 3A-3C are schematic views of a second 3D object being built using a vertical placement technique for placing an ID-tag insert in the second 3D object.
Figure 3B:
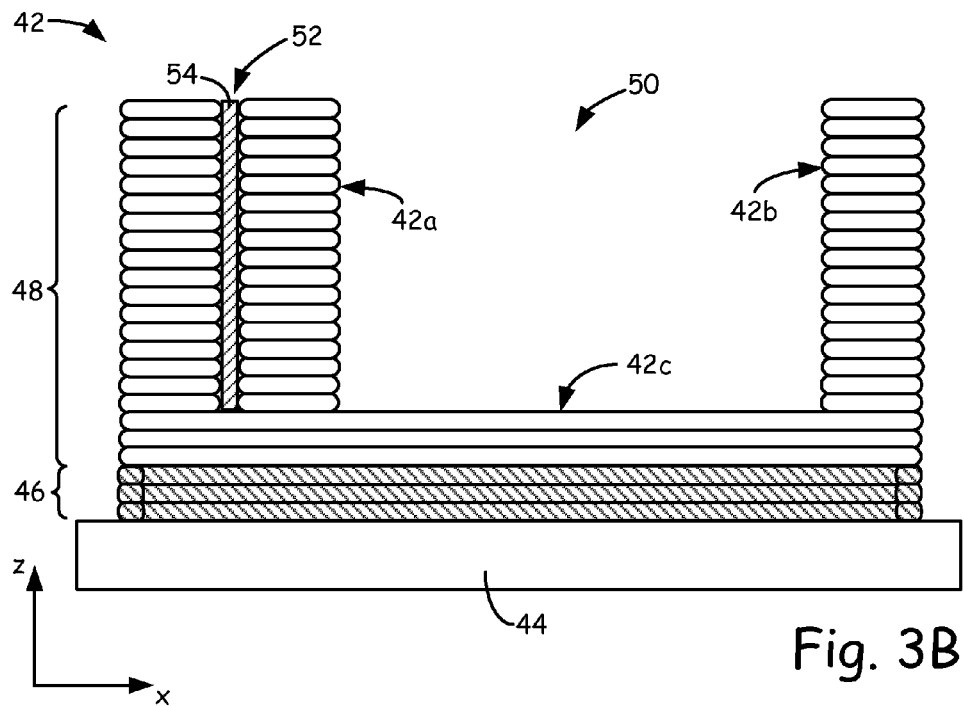
Figure 3C:
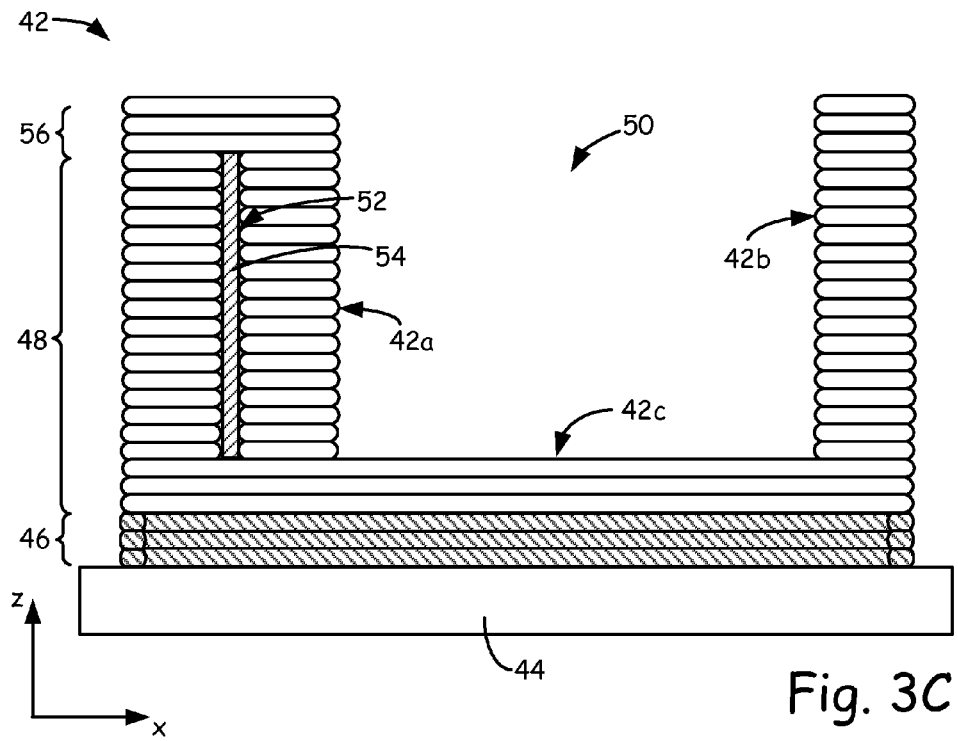

FIGS. 3A-3C are schematic views of 3D object 42 being built on substrate platform 44 of an RP/RM system (not shown), which illustrate a vertical placement technique. As shown in FIG. 3A, pursuant to step 18 of method 10, the RP/RM system initially forms support layers 46 and build layers 48 in a horizontal x-y plane on substrate platform 44. The thicknesses of support layers 46 and build layers 48 are exaggerated for ease of discussion. Build layers 48 are a first set of layers of 3D object 42, and the arrangement of build layers 48 define cavity 50 and pocket 52. Cavity 50 is an unfilled region in 3D object 42 that prevents an ID-tag insert (not shown in FIG. 3A) from being centrally located within 3D object 42.

As discussed above, the ID-tag inserts are desirably placed at locations that substantially preserve the structural integrity the 3D objects. Additionally, for thin-film, ID-tag inserts, the ID-tag inserts are also desirably oriented horizontally, thereby allowing the thin-film, ID-tag inserts to align with the layers of the 3D objects. However, in the example shown in FIG. 3A, the geometry of 3D object 42 is not conducive for the placement of a horizontally-oriented ID-tag insert. As shown, 3D object 42 includes wall portions 42a and 42b, and base portion 42c, where wall portions 42a and 42b are vertical walls and base portion 42c is a horizontal base interconnecting wall portions 42a and 42b. An ID-tag insert having dimensions corresponding to pocket 52 does not fit horizontally within wall portion 42a or wall portion 42b. Furthermore, base portion 42c is not thick enough along the z-axis to retain a horizontally-placed ID-tag insert without reducing the structural integrity 3D object 42. Accordingly, to substantially preserve the structural integrity of 3D object 42, the ID-tag insert may be vertically oriented along the z-axis and placed within wall portion 42a at pocket 52. Pocket 52 is accordingly an unfilled region in build layers 48 that desirably corresponds to the dimensions of the ID-tag insert.

As shown in FIG. 3B, after build layers 48 are formed, ID-tag insert 54 is placed vertically within pocket 52, manually or in an automated manner, pursuant to step 20 of method 10. The placement of ID-tag insert 54 in pocket 52 desirably provides a substantially flush surface between the top edge of ID-tag insert 54 and the top layer of build layers 48. This correspondingly provides a substantially planar working surface for the formation of subsequent layers.

As shown in FIG. 3C, after ID-tag insert 54 is placed in pocket 52, the RP/RM system then forms build layers 56 of 3D object 42 on top of build layers 48 and on top of ID-tag insert 54. Build layers 56 are a second set of layers of 3D object 42, formed pursuant to step 22 of method 10, which complete the build operation for 3D object 42. After the build operation is complete, 3D object 42 may be removed from the RP/RM system and one or more scanning systems may read the information from ID-tag insert 54 (pursuant to step 24 of method 10). As discussed above, in one embodiment, the information may be written to ID-tag insert 54 after ID-tag insert 54 is placed in 3D object 42. In this embodiment, the information may be written to ID-tag 54 at one or more points in time after the build operation is complete, and the written information may be subsequently read, pursuant to step 24 of method 10. One or more actions may then be performed based at least in part on the read information, such as one or more post-build operations (pursuant to step 26 of method 10). As further shown in FIG. 3C, ID-tag insert 54 is fully embedded within wall portion 42a of 3D object 42. This is also beneficial for preserving the aesthetic qualities of 3D object 42, and allows 3D object 42 to undergo post-build, surface-modifying operations (e.g., support structure removal and surface smoothing processes) without adversely affecting ID-tag insert 54.

Figure 4A:
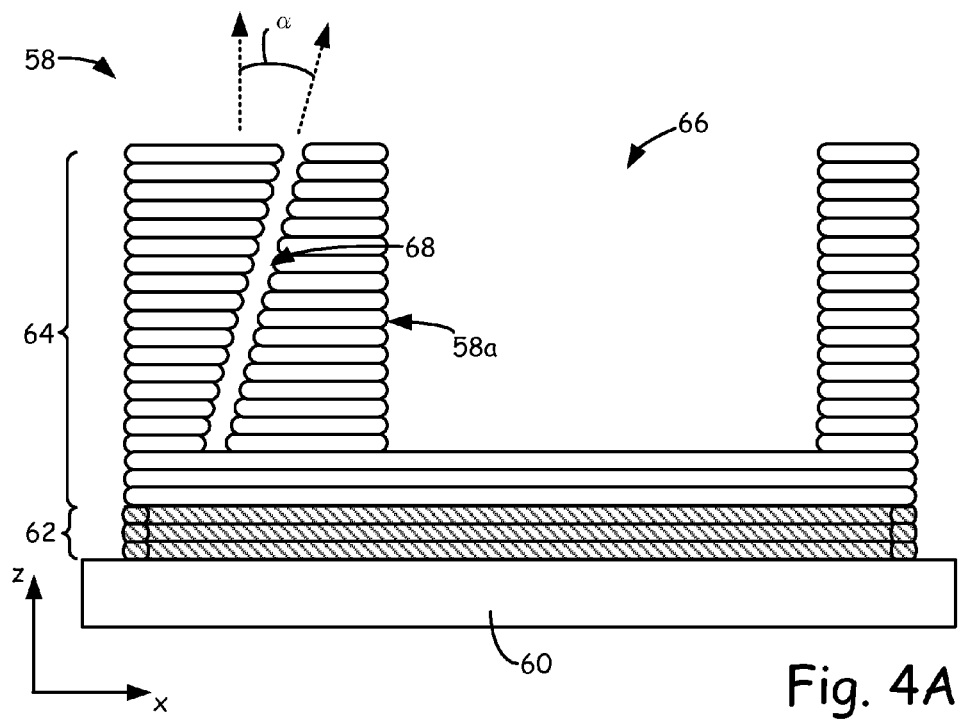
FIGS. 4A-4C are schematic views of a third 3D object being built using a near-vertical placement technique for placing an ID-tag insert in the third 3D object.
Figure 4B:
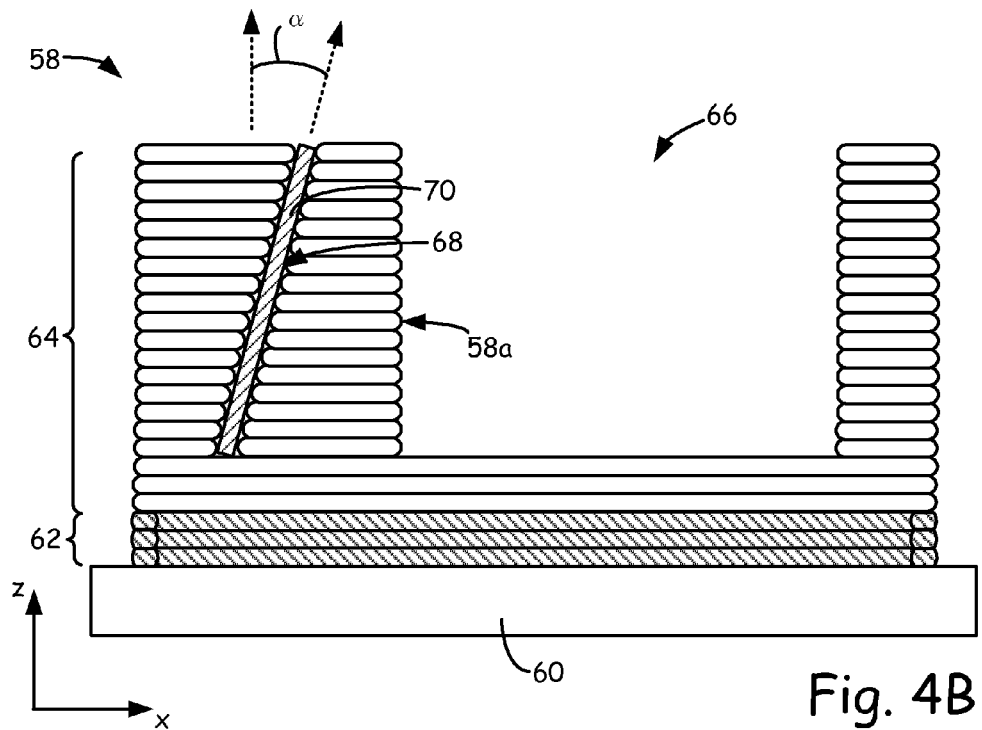
Figure 4C:
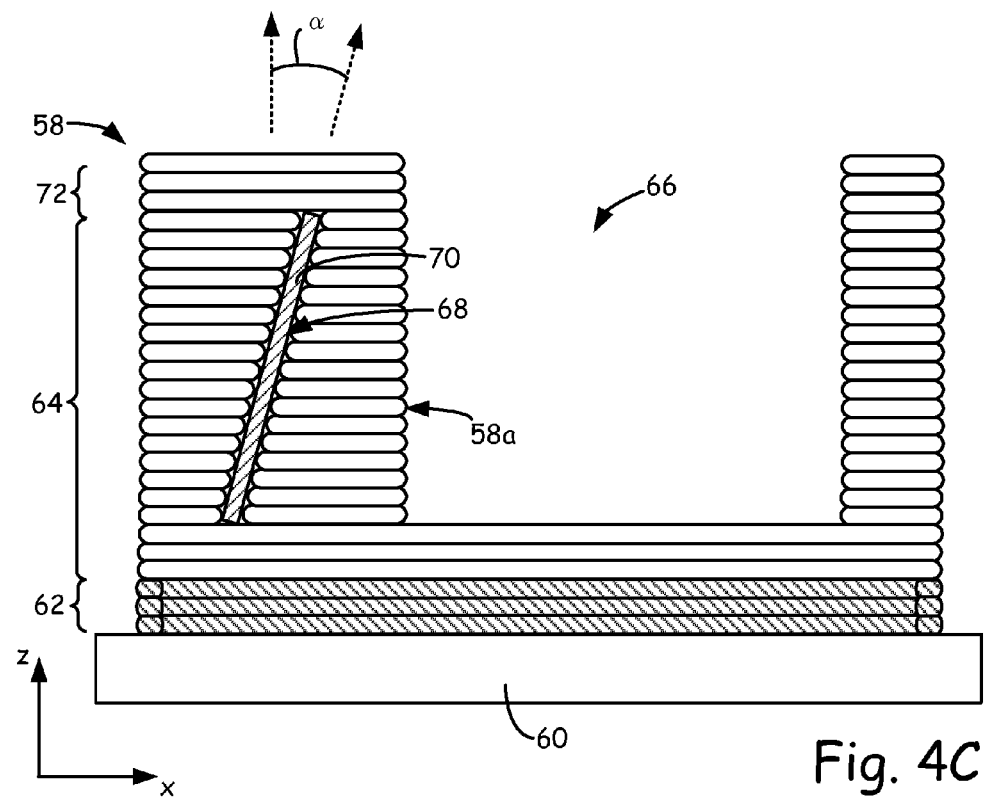

FIGS. 4A-4C are schematic views of 3D object 58 being built on substrate platform 60 of an RP/RM system (not shown), which illustrate a near-vertical placement technique. The near-vertical placement technique is a modification to the vertical placement technique discussed above, and is suitable for situations where an ID-tag insert is not capable of fitting horizontally or vertically within a 3D object (e.g., 3D object 58) without reducing the structural integrity of the 3D object. As shown in FIG. 4A, pursuant to step 18 of method 10, the RP/RM system initially forms support layers 62 and build layers 64 in a horizontal x-y plane on substrate platform 60. The thicknesses of support layers 62 and build layers 64 are exaggerated for ease of discussion.

Build layers 64 are a first set of layers of 3D object 58, and the arrangement of build layers 64 define cavity 66 and pocket 68. Cavity 66 is an unfilled region in 3D object 58 that prevents an ID-tag insert (not shown in FIG. 4A) from being placed in a central location of 3D object 58. As discussed above for 3D object 58 (shown in FIGS. 3A-3C), if the ID-tag insert cannot be placed horizontally in 3D object 58 without reducing the structural integrity of 3D object 58, a vertical orientation may potentially be used. However, for 3D object 58, an ID-tag insert having a length corresponding to the length of pocket 68 would not fit vertically within the wall portion of 3D object 58 (referred to as wall portion 58a) without reducing the structural integrity of 3D object 58.

As shown in FIG. 4A, to accommodate the placement of an ID-tag insert within 3D object 58, while also substantially preserving the structural integrity of 3D object 58, pocket 68 is oriented at angle $\alpha$ from the vertical z-axis. Angle $\alpha$ desirably provides a length for pocket 68 that allows an ID-tag insert to be fully placed within pocket 68, and that also substantially preserves the structural integrity of 3D object 58. Examples of suitable angles $\alpha$ for pocket 68 range from zero degrees (i.e., vertical) to less than about 45 degrees, with particularly suitable angles $\alpha$ ranging from zero degrees to less than about 30 degrees.

As shown in FIG. 4B, after build layers 64 are formed, ID-tag insert 70 is placed within pocket 68, manually or in an automated manner, pursuant to step 20 of method 10. This positions ID-tag insert 70 within wall portion 58a at angle $\alpha$ relative to the z-axis, which desirably provides a substantially flush surface between the top edge of ID-tag insert 70 and the top layer of build layers 64. This provides a substantially planar working surface for the formation of subsequent layers.

As shown in FIG. 4C, after ID-tag insert 70 is placed in pocket 68, the RP/RM system then forms build layers 72 of 3D object 58 on top of build layers 64 and on top of ID-tag insert 70. Build layers 72 are a second set of layers of 3D object 58, formed pursuant to step 22 of method 10, which complete the build operation for 3D object 58. After the build operation is complete, 3D object 58 may be removed from the RP/RM system and one or more scanning systems may read the information from ID-tag insert 70 (pursuant to step 24 of method 10). As discussed above, in one embodiment, the information may be written to ID-tag insert 70 after ID-tag insert 70 is placed in 3D object 58. In this embodiment, the information may be written to ID-tag 70 at one or more points in time after the build operation is complete, and the written information may be subsequently read, pursuant to step 24 of method 10. One or more actions may then be performed based at least in part on the read information, such as one or more post-build operations (pursuant to step 26 of method 10). As shown in FIG. 4C, ID-tag insert 70 is fully embedded within wall portion 58a of 3D object 58. This is also beneficial for preserving the aesthetic qualities of 3D object 58, and allows 3D object 58 to undergo post-build, surface-modifying operations (e.g., support structure removal and surface smoothing processes) without adversely affecting ID-tag insert 70.

Figure 5:
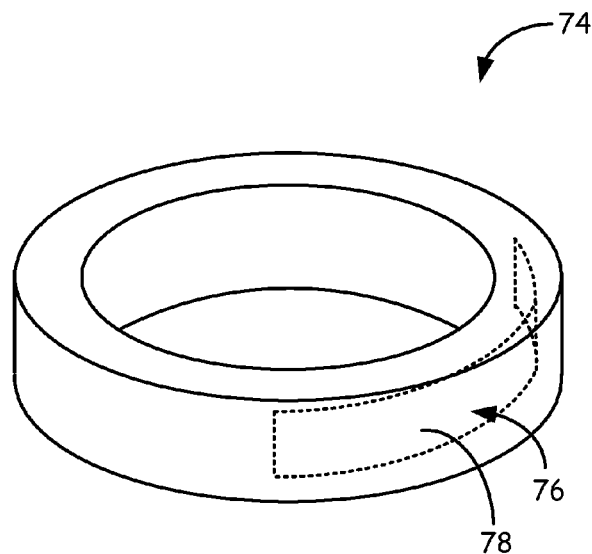
FIG. 5 is a top perspective view of a fourth 3D object, which illustrates a bent-vertical placement technique for placing an ID-tag insert in the fourth 3D object.

FIG. 5 is a top perspective view of 3D object 74, which is built with an RP/RM system pursuant to steps 18-22 of method 10 (shown in FIG. 1), and illustrates a bent-vertical placement technique. The bent-vertical placement technique is an additional modification to the vertical placement technique discussed above, and is suitable for use with flexible ID-tag inserts and 3D objects having conical geometries (e.g., 3D object 74). As shown, 3D object 74 includes curved pocket 76 and ID-tag insert 78, where ID-tag insert 78 is a flexible, thin-film, ID-tag insert that is fully embedded within 3D object 74 at curved pocket 76.

The conical geometry of 3D object 74 prevents ID-tag insert 78 from being placed within curved pocket 76 in a planar orientation. Thus, during the build operation, curved pocket 76 is formed in the build layers of 3D object 74, and ID-tag insert 78 is then biased to match the dimensions of curved pocket 76. The biased ID-tag insert 78 is then inserted into curved pocket 76. The remaining build layers of 3D object 74 are then formed to complete the build operation. The bent-vertical placement technique allows ID-tag inserts (e.g., ID-tag insert 78) to be fully embedded within 3D objects having conical geometries (e.g., 3D object 74), thereby preserving the aesthetic qualities of the 3D objects, and allowing the 3D objects to undergo post-build, surface-modifying operations without adversely affecting ID-tag insert 70.

Figure 6:
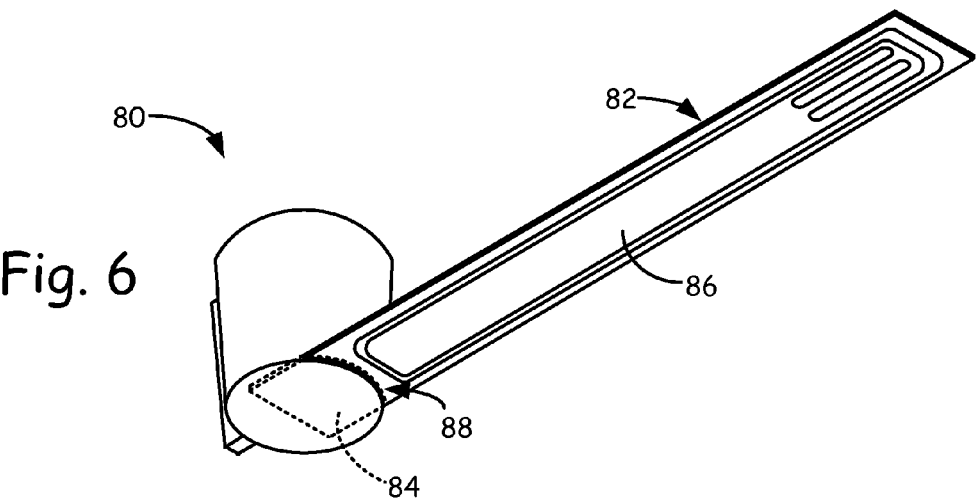
FIG. 6 is a bottom perspective view of a fifth 3D object, which illustrates the use of a break-away ID-tag insert.

FIG. 6 is a bottom perspective view of 3D object 80, which is built with an RP/RM system pursuant to steps 18-22 of method 10 (shown in FIG. 1), and includes ID-tag insert 82 partially embedded within 3D object 80. As shown, ID-tag insert 82 is a break-away ID-tag insert that includes embedded portion 84 (shown with hidden lines), tag portion 86, and perforation 88, where embedded portion 84 and tag portion 86 are connected at perforation 88. This embodiment is beneficial for use with 3D objects (e.g., 3D object 80) that are not large enough to retain fully embedded ID-tag inserts (e.g., ID-tag insert 82). In this embodiment, tag portion 86 is the portion of ID-tag insert 82 that includes the readable information for use after the build operation is complete. As such, after the build operation is complete, one or more scanning systems are used to read the information from tag portion 86 (pursuant to step 24 of method 10), and the read information is used to perform one or more post-build actions on 3D object 80 (pursuant to step 26 of method 10). After the post-build action(s) are complete, tag portion 86 may be removed from embedded portion 86 by tearing ID-tag insert 82 at perforation 88. Tag portion 86 may then be discarded, leaving little or no impact on the surface quality of 3D object 80.

ID-tag inserts suitable for use with method 10 may be provided in a variety of geometries. As discussed above, the ID-tag inserts may be provided as thin-film inserts, pill-shaped inserts, flexible tape inserts, bendable inserts, and break-away inserts. Furthermore, the ID-tag inserts may also have variable geometries, such as ID-tag inserts that are cut-to-size, bent, folded, torqued, stretched, tapped, sized, or otherwise modified from stock material shapes to the shape taken by the placed insert. For example, a RFID tag may be conically bent to conform to the interior rim of a smoke detector shell (as discussed above for ID-tag insert 78, shown in FIG. 5), or a reinforcing wire might be cut and bent in a serpentine system to attain the shape taken by the placed insert. In one embodiment, the intended geometry may be defined by a CAD part designer, and information relating to the intended geometry may be transferred with the insert-placement location and description as part of the CAD model. Additional information that the RP/RM system might require to manipulate the insert (e.g., bending radius and wire tension) may also be supplied.

As discussed above, method 10 (shown in FIG. 1) and the suitable techniques for use in placing the ID-tag inserts in the 3D objects allow a variety of actions to be performed on the 3D objects after the build operations are complete. This increases efficiencies in the production of 3D objects with RP/RM systems, particularly in rapid manufacturing applications, thereby allowing manufacturers to meet individual customer schedules and design requirements. Although the present invention has been described with reference to preferred embodiments, workers skilled in the art will recognize that changes may be made in form and detail without departing from the spirit and scope of the invention.

The invention claimed is:

1. A method for building a three-dimensional object containing an identification-tag insert with an additive manufacturing system in a layer by layer manner, the method comprising:
    performing a build operation to form layers of the three-dimensional object using a layer-based additive technique that utilizes build paths;
    placing the identification-tag insert on at least a portion of the layers during the build operation, thereby at least partially embedding the identification-tag insert in the three-dimensional object; and
    reading information from the identification-tag insert while the identification-tag insert is at least partially embedded within the three-dimensional object.

2. The method of claim 1, wherein the identification-tag insert tag is fully embedded within the three-dimensional object.

3. The method of claim 1, wherein the identification-tag insert comprises a radio-frequency identification tag.

4. The method of claim 1, further comprising performing at least one surface-modifying operation on the three-dimensional object.

5. The method of claim 4, wherein the at least one surface-modifying operation is selected from the group consisting of support structure removal, surface smoothing processes, and combinations thereof.

6. The method of claim 1, wherein the identification-tag insert is placed on at least a portion of the layers in a horizontal orientation.

7. The method of claim 1, wherein the identification-tag insert is placed on at least a portion of the layers at an angle from a vertical axis that ranges from zero degrees to 45 degrees.

8. The method of claim 1, further comprising writing the information to the identification-tag insert while the identification-tag insert is at least partially embedded within the three-dimensional object.

9. A method for building a three-dimensional object containing an identification-tag insert with an additive manufacturing system in a layer by layer manner, the method comprising:
    forming a plurality of layers of the three-dimensional object using a layer-based additive technique with the additive manufacturing system that utilizes tool paths;
    placing at least one identification-tag insert at least one of the plurality of formed layers, thereby at least partially embedding the at least one identification-tag insert in the three-dimensional object;
    reading information from the at least one identification-tag insert while the at least one identification-tag insert is at least partially embedded within the three-dimensional object; and
    performing at least one action on the three-dimensional object based at least in part on the read information wherein the at least one action comprises at least one post-build operation selected from the group consisting of support structure removal, surface smoothing processes, cooling operations, cleaning operations, machining, benching, painting, packaging, and combinations thereof.

10. The method of claim 9, wherein the at least one identification-tag insert tag is fully embedded within the three-dimensional object.

11. The method of claim 9, wherein the at least one identification-tag insert comprises at least one radio-frequency identification tag.

12. The method of claim 9, further comprising generating a data representation of the at least one identification-tag insert in a computer-aided design model of the three-dimensional object.

13. The method of claim 9, wherein the at least one identification-tag insert is placed on at least a portion of the layers in a horizontal orientation.

14. A method for building a three-dimensional object containing an identification-tag insert with an additive manufacturing system in a layer by layer manner, the method comprising:
    forming a first set of layers of the three-dimensional object using a layer-based additive technique that utilizes tool paths;
    placing the identification-tag insert on at least a first portion of the first set of layers;
    forming a second set of layers of the three-dimensional object on at least a second portion of the first set of layers and on at least a portion of the identification-tag insert using the layer-based additive technique such that the identification-tag insert is at least partially embedded between the first set of layers and the second set of layers;
    reading information from the identification-tag insert after forming the second set of layers; and
    performing at least one post-build operation on the three-dimensional object based at least in part on the read information wherein the at least one action comprises at least one post-build operation selected from the group consisting of support structure removal, surface smoothing processes, cooling operations, cleaning operations, machining, benching, painting, packaging, and combinations thereof.

15. The method of claim 14, wherein the at least one identification-tag insert tag is fully embedded between the first set of layers and the second set of layers.

16. The method of claim 14, wherein the at least one identification-tag insert comprises at least one radio-frequency identification tag.

17. The method of claim 14, further comprising:
    receiving a computer-aided design model of the three-dimensional object; and
    generating a data representation of the identification-tag insert in the computer-aided design model.

18. The method of claim 14, wherein forming a first set of layers of the three-dimensional object comprises forming an unfilled region having dimensions substantially corresponding to dimensions of the identification-tag insert, and wherein placing the identification-tag insert on at least the first portion of the first set of layers comprises placing the identification-tag insert in the unfilled region.

* * * * *